United States Patent
Hanzawa et al.

(10) Patent No.: US 6,444,063 B2
(45) Date of Patent: Sep. 3, 2002

(54) SI-SIC MATERIAL AND SIC FIBER-REINFORCED SI-SIC COMPOSITE MATERIAL

(75) Inventors: Shigeru Hanzawa, Kagamihara; Masatoshi Futakawa, Mito; Saburo Shimizu, Naka-gun; Kaoru Onuki, Hitachinaka; Ikuo Ioka, Naka-gun, all of (JP); Ynte Johan Stockmann, Limerick (IE)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 09/847,436

(22) Filed: May 3, 2001

Related U.S. Application Data

(62) Division of application No. 09/114,260, filed on Jul. 13, 1998, now Pat. No. 6,254,974.

(30) Foreign Application Priority Data

Jul. 18, 1997 (JP) .............................................. 9-194132

(51) Int. Cl.$^7$ .............................. B05D 3/02; B28B 3/00; B28B 5/00; B27N 3/02
(52) U.S. Cl. .................. 156/62.2; 427/299; 427/376.2; 264/112; 264/643
(58) Field of Search ................................ 156/62.2, 276, 156/285, 306.3; 264/58, 112, 643; 427/299, 379, 376.2, 431

(56) References Cited

U.S. PATENT DOCUMENTS

| | | | |
|---|---|---|---|
| 4,294,788 A | * | 10/1981 | Laskow et al. ............. 264/101 |
| 4,795,673 A | | 1/1989 | Frechette et al. |
| 4,923,832 A | * | 5/1990 | Newkirk et al. ............ 501/128 |
| 5,354,398 A | | 10/1994 | Kawai |
| 5,354,528 A | | 10/1994 | Akiyama et al. |
| 5,455,000 A | | 10/1995 | Seyferth et al. |
| 5,503,122 A | | 4/1996 | Ritland et al. |
| 5,549,151 A | | 8/1996 | Yang |
| 5,552,352 A | * | 9/1996 | Brun et al. ................... 501/88 |
| 5,562,774 A | | 10/1996 | Breidenbach et al. |
| 5,628,938 A | * | 5/1997 | Sangeeta et al. .............. 264/28 |
| 5,735,332 A | | 4/1998 | Ritland et al. |
| 5,952,100 A | | 9/1999 | Corman et al. |

FOREIGN PATENT DOCUMENTS

| | | | |
|---|---|---|---|
| JP | 56-114871 A | * | 9/1981 |
| JP | 9-45467 | | 2/1997 |

* cited by examiner

*Primary Examiner*—Michael Barr
(74) *Attorney, Agent, or Firm*—Parkhurst & Wendel, L.L.P

(57) ABSTRACT

A Si—SiC material of Si concentration-gradient type is obtained by melt-infiltrating Si into a molded material comprising SiC particles. The Si—SiC material has a porosity of 1.0% or less and in the Si—SiC material the Si concentration decreases gradually from the surface layer towards the innermost layer. A SiC fiber-reinforced Si—SiC composite material of Si concentration-gradient type is obtained by melt-infiltrating Si into a molded material comprising a SiC fiber and SiC particles. The composite material has a porosity of 1.0% or less and in the composite material the Si concentration decreases gradually from the surface layer towards the innermost layer. These materials are significantly improved in corrosion resistance in highly oxidative and corrosive environment, strength, and healability of defects of surface layer and innermost layer.

4 Claims, No Drawings

SI-SIC MATERIAL AND SIC FIBER-REINFORCED SI-SIC COMPOSITE MATERIAL

This is a Division of application Ser. No. 09/114,260 filed Jul. 13, 1998 now U.S. Pat. No. 6,254,974.

BACKGROUND OF THE INVENTION

(1) Field of the Invention

The present invention relates to a Si—SiC material of Si concentration-gradient type and a SiC fiber-reinforced Si—SiC composite material of Si concentration-gradient type, both superior in properties such as weatherability, oxidation resistance, creeping resistance, strength, toughness and the like, as well as to processes for production of said materials.

(2) Description of Related Art

In the midst of rapid progress of technological innovation, big projects are being planned and carried out in various parts of the world for development of state-of-the-art technologies such as space shuttle and space plane (in the field of space development), high-temperature combustion gas turbine (in the field of energy) and high-temperature gas furnace and nuclear fusion reactor (in the field of atomic energy).

Also, utilization of hydrogen energy is being studied in order to use it as an energy other than nuclear energy and solar energy. In this connection, expensive metal or fine ceramic is being investigated to use it as a reactor material. These structural materials must have high strength at intermediate to high temperatures (200 to 2,000° C.), high reliabilities in toughness and impact resistance, and resistances to environment (e.g. corrosion resistance, oxidation resistance and radiation resistance).

Currently, as a ceramic superior in heat resistance, there are newly developed ceramics, i.e. silicon nitride and silicon carbide both having high strength. They, however, are inherently fragile and are very fragile even when there have small flaws, and further have low resistance to thermal or mechanical impact.

In order to overcome these drawbacks of the above ceramics, there was developed a ceramic matrix material (CMC) wherein a continuous ceramic fiber is mixed with a ceramic. This material, having high strength and high toughness even at high temperatures, excellent impact resistance and excellent resistances to environment, is under active study as a structural material having an ultrahigh resistance to heat, in Europe, U.S.A., etc.

For example, there was developed a ceramic matrix composite (CMC) wherein a fiber was mixed into a ceramic matrix, by making ceramic long fibers (ordinarily several hundreds to several thousands fibers) having a diameter of about 10 μm, into a fiber bundle (a yarn), arranging these fiber bundles two-dimensionally or three-dimensionally to form a unidirectional sheet or a cloth, or laminating a plurality of such sheets or such cloths to form a preliminary molded material (a fiber preform) having a desired shape, and forming, inside the preliminary molded material, a matrix by, for example, (a) chemical vapor infiltration or (b) inorganic polymer infiltration and sintering, or filling the inside of the preliminary molded material with a ceramic powder by casting and sintering the resulting material to form a matrix inside the preliminary molded material.

In the sintering (firing) used in production of conventional ceramic matrix material, however, no attention was paid to the CO gas generated in the process, and it was conducted only to introduce an inert gas by a slight pressure control mainly for prevention of Si vaporization.

Consequently, the CO gas produced during firing in association with the conversion of organic polymer into ceramic, by the reaction of free carbon (present in firing atmosphere) and $O_2$ and the reaction of free carbon and $SiO_2$, is liberated to form defects; these defects and the growth of β-SiC crystals bring about significant deterioration of strength; further, the pores in produced ceramic matrix material cannot be reduced to zero and their size is as large as about 1 mm, inviting deterioration of weatherability and oxidation resistance.

Further, although the conventional ceramic matrix material contains a SiC fiber inside, the thermal stress which the material receives during actual use, is caused by the difference in thermal expansion between SiC fiber and Si—SiC moiety; therefore, the material has had laminar peeling in some cases.

SUMMARY OF THE INVENTION

In view of the above-mentioned problems of the prior art, the present invention has been completed with objects of providing:

a Si—SiC material of Si concentration-gradient type and a SiC fiber-reinforced Si—SiC composite material of Si concentration-gradient type, both significantly improved in corrosion resistance in highly oxidative and corrosive environment, strength, and healability of defects of surface layer and innermost layer, and processes for production of the above materials.

The further objects of the present invention are to provide:

a SiC fiber-reinforced Si—SiC composite material of Si concentration-gradient type, which has substantially no pore unlike ceramic matrix materials (CMC) having pores, such as SiC fiber-reinforced Si—SiC composite material obtained by CVD or infiltration of inorganic polymer and which is improved in toughness while having the features of Si—SiC sintered materials, such as high oxidation resistance, creeping resistance, and strength and toughness from ordinary temperature to high temperatures, and a process for production of the above material.

According to the present invention, there is provided a Si—SiC material of Si concentration-gradient type obtained by melt-infiltrating Si into a molded material comprising SiC particles, which Si—SiC material has a porosity of 1.0% or less and in which Si—SiC material the Si concentration decreases gradually from the surface layer towards the innermost layer.

In the above Si—SiC material of Si concentration-gradient type, it is preferred that the ratio of the Si concentration of the surface layer and the Si concentration of the innermost layer is in a range of innermost layer/surface layer=0/100 to 90/100.

According to the present invention, there is also provided a process for producing a Si—SiC material of Si concentration-gradient type by melt-infiltrating Si into a molded material comprising SiC particles, which process comprises preparing at least two kinds of mixtures each comprising SiC particles having a different tap density, laminating the mixtures to form a molded material, keeping the molded material and Si at a temperature of 1,100 to 1,400° C. in an inert gas atmosphere, and then increasing the temperature to 1,500 to 2,500° C. to melt-infiltrate Si into the molded material.

In the above process, it is preferred that the molded material and Si are kept at a temperature of 1,100 to 1,400° C. at a pressure of 0.1 to 10 hPa for at least one hour with an inert gas being flown in an amount of 0.1 NL or more per kg of the total of the molded material and Si and then the temperature is increased to 1,500 to 2,500° C. to melt-infiltrate Si into the molded material. The inert gas is preferably Ar.

According to the present invention, there is also provided a SiC fiber-reinforced Si—SiC composite material of Si concentration-gradient type obtained by melt-infiltrating Si into a molded material comprising a SiC fiber and SiC particles, which composite material has a porosity of 1.0% or less and in which composite material the Si concentration decreases gradually from the surface layer towards the innermost layer.

In the above SiC fiber-reinforced Si—SiC composite material of Si concentration-gradient type, it is preferred that the ratio of the Si concentration of the surface layer and the Si concentration of the innermost layer is in a range of innermost layer/surface layer =0/100 to 90/100.

Also in the above SiC fiber-reinforced Si—SiC composite material of Si concentration-gradient type, the oxygen content of the SiC fiber is preferably 0.5 mass % or less and the SiC fiber may have a form of two-dimensional or three-dimensional cloth.

According to the present invention, there is also provided a process for producing a SiC fiber-reinforced Si—SiC composite material of Si concentration-gradient type obtained by melt-infiltrating Si into a molded material comprising a SiC fiber and SiC particles, which process comprises preparing at least two kinds of mixtures each comprising SiC particles having a different tap density, mixing a SiC fiber into each mixture, laminating the resulting mixtures to form a molded material, keeping the molded material and Si at a temperature of 1,100 to 1,400° C. in an inert gas atmosphere, and then increasing the temperature to 1,500 to 2,500° C. to melt-infiltrate Si into the molded material.

In the above process for producing a SiC fiber-reinforced Si—SiC composite material of Si concentration-gradient type, it is preferred that the molded material and Si are kept at a temperature of 1,100 to 1,400° C. at a pressure of 0.1 to 10 hPa for at least one hour with an inert gas being flown in an amount of 0.1 NL or more per kg of the total of the molded material and Si and then the temperature is increased to 1,500 to 2,500° C. to melt-infiltrate Si into the molded material. The inert gas is preferably Ar.

DETAILED DESCRIPTION OF THE INVENTION

In the Si—SiC material of Si concentration-gradient type and the SiC fiber-reinforced Si—SiC composite material of Si concentration-gradient type both of the present invention, the porosity is almost zero (1.0% or less) and the Si concentration decreases gradually from the surface layer towards the innermost layer.

Thereby, the present materials have excellent corrosion resistance in highly oxidative or corrosive environment and excellent strength, and are significantly improved in heal-ability of defects of surface layer and innermost layer.

Description is first made on the process for production of the present Si—SiC material of Si concentration-gradient type.

The Si—SiC material of Si concentration-gradient type of the present invention is obtained by melt-infiltrating Si into a molded material comprising SiC particles.

The properties of the Si—SiC material of Si concentration-gradient type differ depending upon the structure of the molded material into which Si is to be melt-infiltrated. Therefore, the production method of the molded material is very important and it is preferred to produce the molded material according to the following method.

Compaction molding as one example of the production method of the molded material used in the present process is described below.

The main raw material of the molded material is SiC granulated particles obtained by subjecting, to granulation by spray drying or the like, a mixture comprising SiC coarse particles having an average particle diameter of 50 to 100 $\mu$m, SiC fine particles having an average particle diameter of 0.1 to 10 $\mu$m and, desirably, a carbon powder having an average particle diameter of 0.1 to 30 $\mu$m. Preferably, at least two kinds of SiC granulated particles different in tap density are appropriately selected and used.

Incidentally, "tap density" is a bulk specific gravity obtained when a powder is placed in a container and shaken or tapped for a given length of time for stabilization.

SiC granulated particles having a tap density of 0.7 to 0.85 are filled in a given mold and subjected to press molding or the like to prepare preliminary molded material 1.

In the same manner are prepared preliminary molded material 2 comprising SiC granulated particles having a tap density of 0.85 to 1.00 and preliminary molded material 3 comprising SiC granulated particles having a tap density of 1.00 to 1.3.

As shown above, the tap densities of the SiC particles of the preliminary molded materials 1 to 3 are set so as to be "preliminary molded material 1<preliminary molded material 2<preliminary molded material 3".

Then, these preliminary molded materials are made into a molded material. In that case, it is important that the preliminary molded material comprising SiC particles of the smallest tap density forms the surface layer of the molded material and that the innermost layer of the molded material is formed by at least one preliminary molded material comprising SiC particles having a tap density larger than that of the surface layer. Also, it is preferred that the preliminary molded materials are disposed so that the tap density of SiC particles increases gradually from the surface layer of the molded material towards the innermost layer.

For example, the preliminary molded materials are disposed so as to form a sandwich structure of "preliminary molded material 1-preliminary molded material 2-preliminary molded material 1" or "preliminary molded material 1-preliminary molded material 3-preliminary molded material 1" or "preliminary molded material 1-preliminary molded material 2-preliminary molded material 3-preliminary molded material 2-preliminary molded material 1"; then, press molding is conducted to produce a laminated molded material.

Further, cast molding as other example of the production method of the molded material used in the present process is described below.

First, as main materials of the molded material, there are prepared slurries by adding an organic binder and water to a mixture comprising SiC coarse particles having an average particle diameter of 50 to 100 $\mu$m, SiC fine particles having an average particle diameter of 0.1 to 10 $\mu$m and, desirably, a carbon powder having an average particle diameter of 0.1 to 30 $\mu$m. Preferably, few to several kinds of slurries different in the proportion (weight %) of the SiC coarse particles and the SiC fine particles (these two kinds of SiC particles are main materials of each slurry) are appropriately selected and used.

Specifically, there are prepared slurry A comprising the SiC coarse particles (20 to 40% by weight) and the SiC fine particles (80 to 60% by weight), slurry B comprising the SiC coarse particles (40 to 60% by weight) and the SiC fine particles (60 to 40% by weight), and slurry C comprising the SiC coarse particles (60 to 80% by weight) and the SiC fine particles (40 to 20% by weight).

The total amount of SiC particles (the SiC coarse particles and the SiC fine particles) in each of slurries A to C is constant. Therefore, when the proportion (weight %) of the SiC coarse particles is high, the proportion (weight %) of the SiC fine particles is low; and when the proportion (weight %) of the SiC coarse particles is low, the proportion (weight %) of the SiC fine particles is high.

Next, a molded material is produced using these slurries. In that case, it is necessary that a slurry comprising the SiC coarse particles in the highest proportion (weight %) is disposed so as to form the surface layer of the molded material and that the innermost layer of the molded material is formed so as to comprise the SiC coarse particles in a proportion (weight %) smaller than that in the surface layer and the SiC fine particles in a proportion (weight %) larger than that in the surface layer. Preferably, the innermost layer of the molded material is formed so that in a position closer to the center of the molded material, the proportion (weight %) of the SiC coarse particles is smaller and the proportion (weight %) of the SiC fine particles is larger.

In an example, slurries A to C are cast into a given mold so as to form a sandwich structure of "slurry A-slurry B-slurry A" or "slurry A-slurry C-slurry A" or "slurry A-slurry B-slurry C-slurry B-slurry A", whereby a laminated molded material is produced.

In melt-infiltrating Si into the molded material produced by any of the above two processes, since the molded material is produced so that the innermost layer has a smaller porosity (Si is later infiltrated into these pores) than the surface layer has, the concentration of Si infiltrated can be made smaller from the surface layer towards the innermost layer, that is, the Si concentration can have a gradient. The ratio of the Si concentration of the innermost layer and the Si concentration of the surface layer can be allowed to be in a range of innermost layer/surface layer 0/100 to 90/100.

The laminated molded material produced as above is kept, together with Si, in a firing furnace at a temperature range of 1,100 to 1,400° C. at a pressure of 0.1 to 10 hPa for at least one hour with an inert gas being flown in an amount of 0.1 NL (normal liter) (corresponding to 5,065 liters of 1,200° C. and 0.1 hPa), whereby a molded material to be impregnated with Si is produced.

Next, the molded material to be impregnated with Si is heated to a temperature of 1,500 to 2,500° C., preferably 1,700 to 1,800° C. to melt-infiltrate Si thereinto, to produce a Si—SiC material of Si concentration gradient-type according to the present invention.

In the present process for production of Si—SiC molded material of Si concentration-gradient type, it is desirable that the molded material and Si are kept in a firing furnace at a temperature of 1,100 to 1,400° C. at a pressure of 0.1 to 10 hPa for at least one hour with an inert gas being flown in an amount of 0.1 NL or more, preferably 1 NL or more, more preferably 10 NL or more per kg of the total of the molded material and Si.

Thus, by conducting the firing stage (a stage prior to Si melting and infiltration) in an inert gas current, the gas (e.g. CO) generated in conversion of inorganic polymer or inorganic substance into ceramic is removed from the firing atmosphere and, moreover, the pollution of the firing atmosphere with external factor (e.g. $O_2$ in air) is prevented; as a result, the Si—SiC material of Si concentration-gradient type obtained by subsequent melt-infiltration of Si into molded material can have substantially zero porosity.

In melt-infiltration of Si into the fired molded material, the atmosphere temperature is increased to 1,500 to 2,500° C., preferably 1,700 to 1,800° C. In this case, the pressure inside the firing furnace is preferably 0.1 to 10 hPa.

As stated above, in the Si—SiC material of Si concentration-gradient type, since the Si concentration is high in the innermost layer as compared with that in the surface layer, the microcracks appearing in the material can be healed. As a result, the material can retain oxidation resistance.

Further, in the Si—SiC material of Si concentration-gradient type, the surface layer is made of a protective film completely impregnated with Si. Therefore, the material has remarkably improved corrosion resistance in a highly oxidative and corrosive environment and the surface defects can be made smaller and removed. As a result, the material has even improved strength in a highly oxidative and corrosive environment.

Description is then made on the process for production of the present SiC fiber-reinforced Si—SiC composite material of Si concentration-gradient type.

The SiC fiber-reinforced Si—SiC composite material of Si concentration-gradient type of the present invention is obtained by melt-infiltrating Si into a molded material comprising a SiC fiber and SiC particles.

The properties of the SiC fiber-reinforced Si—SiC composite material of Si concentration-gradient type differ depending upon the structure of the molded material into which Si is to be melt-infiltrated. Therefore, the production method of the molded material is very important and it is preferred to produce the molded material according to the following method.

Compaction molding as one example of the production method of the molded material used in the present process is described below.

First, fine SiC fibers (ordinarily several hundreds to several thousands fibers) having a diameter of about 10 μm are made into a fiber bundle (a yarn); and these fiber bundles are arranged two-dimensionally or three-dimensionally to form a unidirectional sheet or a cloth, or such sheets or such cloths are laminated to form a fiber preform having a desired shape.

The main raw material of the molded material is SiC granulated particles obtained by subjecting, to granulation by spray drying or the like, a mixture comprising SiC coarse particles having an average particle diameter of 50 to 100 μm, SiC fine particles having an average particle diameter of 0.1 to 10 μm and, desirably, a carbon powder having an average particle diameter of 0.1 to 30 μm. Preferably, at least two kinds of SiC granulated particles different in tap density are appropriately selected and used.

SiC granulated particles having a tap density of 0.7 to 0.85 are arranged in a layer with the above-obtained fiber preform being placed in the middle of the layer so as to form a sandwich structure, and subjected to press molding or the like to prepare preliminary molded material 1.

In the same manner are prepared preliminary molded material 2 comprising SiC granulated particles having a tap density of 0.85 to 1.00 and preliminary molded material 3 comprising SiC granulated particles having a tap density of 1.00 to 1.3.

As shown above, the tap densities of the SiC particles of the preliminary molded materials 1 to 3 are set so as to be "preliminary molded material 1<preliminary molded material 2<preliminary molded material 3".

Then, these preliminary molded materials are made into a molded material. In that case, it is important that the preliminary molded material comprising SiC particles of the smallest tap density forms the surface layer of the molded material and that the innermost layer of the molded material is formed by at least one preliminary molded material comprising SiC particles having a tap density larger than that of the surface layer. Also, it is preferred that the preliminary molded materials are disposed so that the tap density of SiC particles increases gradually from the surface layer of the molded material towards the innermost layer.

For example, the preliminary molded materials are disposed so as to form a sandwich structure of "preliminary molded material 1-preliminary molded material 2-preliminary molded material 1" or "preliminary molded material 1-preliminary molded material 3-preliminary molded material 1" or "preliminary molded material 1-preliminary molded material 2-preliminary molded material 3-preliminary molded material 2-preliminary molded material 1"; then, press molding is conducted to produce a molded material.

Further, cast molding as other example of the production method of the molded material is described below.

First, fine SiC fibers (ordinarily several hundreds to several thousands fibers) having a diameter of about 10 $\mu$m are made into a fiber bundle (a yarn); and these fiber bundles are arranged two-dimensionally or three-dimensionally to form a unidirectional sheet or a cloth, or such sheets or such cloths are laminated to form a fiber preform having a desired shape.

Then, as main materials of the molded material, there are prepared slurries by adding an organic binder and water to a mixture comprising SiC coarse particles having an average particle diameter of 50 to 100 $\mu$m, SiC fine particles having an average particle diameter of 0.1 to 10 $\mu$m and, desirably, a carbon powder having an average particle diameter of 0.1 to 30 $\mu$m. Preferably, few to several kinds of slurries different in the proportion (weight %) of the SiC coarse particles and the SiC fine particles (these two kinds of SiC particles are main materials of each slurry) are appropriately selected and used.

Slurry A comprising the SiC coarse particles (20 to 40% by weight) and the SiC fine particles (80 to 60% by weight) is cast into a given mold in which the above-obtained fiber preform has been placed, to impregnate the fiber preform with the slurry, whereby preliminary molded material A is produced.

In the same manner, there are produced preliminary molded material B by using slurry B comprising the SiC coarse particles (60 to 40% by weight) and the SiC fine particles (40 to 60% by weight), and preliminary molded material C by using slurry C comprising the SiC coarse particles (60 to 80% by weight) and the SiC fine particles (40 to 20% by weight).

In the slurries A to C of the preliminary molded materials A to C, the total amount of SiC particles (the SiC coarse particles and the SiC fine particles) is constant. Therefore, when the proportion (weight %) of the SiC coarse particles is high, the proportion (weight %) of the SiC fine particles is low; and when the proportion (weight %) of the SiC coarse particles is low, the proportion (weight %) of the SiC fine particles is high.

Next, a molded material is produced using these preliminary molded materials. In that case, it is necessary that a preliminary molded material comprising the SiC coarse particles in the highest proportion (weight %) is disposed so as to form the surface layer of the molded material and that the innermost layer of the molded material is formed with a preliminary molded material comprising the SiC coarse particles in a proportion (weight %) smaller than that in the surface layer and the SiC fine particles in a proportion (weight %) larger than that in the surface layer. Preferably, the innermost layer of the molded material is formed so that in a position closer to the center of the molded material, the proportion (weight %) of the SiC coarse particles is smaller and the proportion (weight %) of the SiC fine particles is larger.

For example, the preliminary molded materials are disposed so as to form a sandwich structure of "preliminary molded material A-preliminary molded material B-preliminary molded material A" or "preliminary molded material A-preliminary molded material C-preliminary molded material A" or "preliminary molded material A-preliminary molded material B-preliminary molded material C-preliminary molded material B-preliminary molded material A"; then, press molding is conducted to produce a molded material.

In melt-infiltrating Si into the molded material produced by any of the above two processes, since the molded material is produced so that the innermost layer has a smaller porosity (Si is later infiltrated into the pores) than the surface layer has, the concentration of Si infiltrated can be made smaller from the surface layer towards the innermost layer, that is, the Si concentration can have a gradient. The ratio of the Si concentration of the innermost layer and the Si concentration of the surface layer can be allowed to be in a range of innermost layer/surface layer=0/100 to 90/100.

The molded material produced as above is kept, together with Si, in a firing furnace at a temperature range of 1,100 to 1,400° C. at a pressure of 0.1 to 10 hPa for at least one hour with an inert gas being flown in an amount of 0.1 NL (normal liter) (corresponding to 5,065 liters of 1,200° C. and 0.1 hPa), whereby a molded material to be impregnated with Si is produced.

Next, the molded material to be impregnated with Si is heated to a temperature of 1,500 to 2,500° C., preferably 1,700 to 1,800° C. to melt-infiltrate Si thereinto, to produce a SiC fiber-reinforced Si—SiC composite material of Si concentration gradient-type according to the present invention wherein a SiC fiber and a Si—SiC sintered material have been made into a composite material.

In the present process for production of SiC fiber-reinforced Si—SiC composite material of Si concentration-gradient type, it is desirable that the molded material and Si are kept in a firing furnace at a temperature of 1,100 to 1,400° C. at a pressure of 0.1 to 10 hPa for at least one hour with an inert gas being flown in an amount of 0.1 NL or more, preferably 1 NL or more, more preferably 10 NL or more per kg of the total of the molded material and Si.

Thus, by conducting the firing stage (a stage prior to Si melting and infiltration) in an inert gas current, the gas (e.g. CO) generated in conversion of inorganic polymer or inorganic substance into ceramic is removed from the firing atmosphere and, moreover, the pollution of the firing atmosphere with external factor (e.g. $O_2$ in air) is prevented; as a result, the SiC fiber-reinforced Si—SiC composite material of Si concentration-gradient type obtained by subsequent melt-infiltration of Si into molded material can have substantially zero porosity.

In melt-infiltration of Si into the fired molded material, the atmosphere temperature is increased to 1,500 to 2,500° C., preferably 1,700 to 1,800° C. In this case, the pressure inside the firing furnace is preferably 0.1 to 10 hPa.

As described above, the SiC fiber-reinforced Si—SiC composite material of Si concentration-gradient type according to the present invention is substantially free from pores which are present in conventional ceramic matrix materials (CMC) (e.g. SiC fiber-reinforced Si—SiC composite materials) produced by CVD or inorganic fiber infiltration; therefore, the present composite material, as compared with conventional ceramic matrix materials (CMC), is dense and moreover retains excellent features of Si—SiC sintered material, such as oxidation resistance, creeping resistance, strength from ordinary temperature to high temperatures and toughness. Further, in obtaining a bonded ceramic material from a plurality of non-oxide ceramic members (e.g. Si-based ceramics) containing an excessive amount of an element participating in bonding, by allowing a metal to be present between said members to be bonded and heating them in a non-oxidizing atmosphere to form a compound of (1) said element participating in bonding and (2) said metal at the portion where said bonding is to be made, according to a procedure as described in Japanese Patent Application Kokai (Laid-Open) No. 128046/1994, the SiC fiber-reinforced Si—SiC composite material of Si concentration-gradient type of the present invention, since having a Si-rich layer at the surface, can enable ceramic-to-ceramic bonding easily.

Furthermore, the present composite material can be used in an article such as crucible for chemical liquid, or the like. In that case, the surface of the present composite material is used as the inside of the crucible which comes in contact with the liquid, and the innermost layer of the present composite material is used as the outside of the crucible which makes no contact with the liquid.

The present invention is described in more detail below by way of Examples. However, the present invention is not restricted to these Examples.

The properties of the materials and composite materials obtained in Examples were measured according to the following methods.
(Porosity)
Was measured by the Archimedes method.

Porosity (%)=[$(W_3-W_1)/(W_3-W_2)$]×100

$W_1$ is a dry weight obtained by drying a sample in an oven of 100° C. for 1 hour, followed by weighing.

$W_2$ is an in-water weight obtained by boiling a sample in water to infiltrate water completely into the pores, followed by weighing in water.

$W_3$ is a water-saturated weight obtained by infiltrating water completely into the pores of a sample, followed by weighing in air.
(Oxidation Resistance)
A test piece of 60 mm×60 mm×5 mm (thickness) was prepared by cutting; it was allowed to stand in a furnace of 1,150° C. in an $O_2$ gas current containing saturated steam of 90° C., to give rise to the oxidation of the test piece; and the per-hour weight increase of the test piece by oxidation was measured.

(Bending Strength)
A test sample was subjected to a four-point bending strength test at ordinary temperature according to JIS R 1601 "Test Method for Bending Strength of Fine Ceramics", using the plane of the test sample at the half thickness (the plane is the central plane of the test sample) as a tensile plane.
(Si Concentration)
From a test sample having a thickness of 10 mm were cut out a surface layer having a thickness of 0.5 mm and an innermost layer having a thickness of 0.5 mm. The two layers were measured for Si content by fluorescent X-ray analysis.

EXAMPLES 1 to 3

There were mixed 70% by weight of SiC coarse particles having an average particle diameter of 100 μm, 30% by weight of Sic fine particles having an average particle diameter of 5 μm and 10% by weight, based on 100% by weight of the total SiC particles, of a C powder having an average particle diameter of 2 μm. To 100% by weight of the resulting mixture were added 2% by weight of an organic binder and 10% by weight of water to obtain a slurry mixture (material A).

There were mixed 50% by weight of SiC coarse particles having an average particle diameter of 100 μm, 50% by weight of SiC fine particles having an average particle diameter of 5 μm and 5% by weight, based on 100% by weight of the total SiC particles, of a C powder having an average particle diameter of 2 μm. To 100% by weight of the resulting mixture were added 1.5% by weight of an organic binder and 14% by weight of water to obtain a slurry mixture (material B).

Material A obtained above was cast into a gypsum mold of 100 mm×100 mm×30 mm (height) at a thickness of 5 mm; thereon was cast material B at a thickness of 5 mm; thereon was cast material A at a thickness of 5 mm to produce a molded material (molded material 1) of 100 mm×100 mm×15 mm.

Molded material 1 was vertically placed in a carbon crucible filled with a Si powder having a purity of 99.8% and an average particle diameter of 1 mm. The carbon crucible was transferred into a firing furnace.

The temperature inside the firing furnace was kept at 1,100 to 1,400° C. and the crucible contents were subjected to a firing treatment under the conditions of inert gas flow rate, in-furnace pressure and treatment time, shown in Table 1. Then, while the in-furnace pressure was kept at the same level, the in-furnace temperature was increased to the maximum temperature shown in Table 1 to infiltrate Si into molded material 1, whereby a Si—SiC material of Si concentration-gradient type was produced.

The porosity and Si concentration of the Si—SiC material are shown in Table 1.

EXAMPLES 4 to 9

There were mixed 70% by weight of SiC coarse particles having an average particle diameter of 100 μm, 30% by weight of SiC fine particles having an average particle diameter of 5 μm and 10% by weight, based on 100% by weight of the total SiC particles, of a C powder having an average particle diameter of 2 μm. To 100% by weight of the resulting mixture were added 5% by weight of an organic binder and an appropriate amount of water to obtain a slurry mixture. This slurry mixture was subjected to granulation by the use of a spray dryer to produce granulated particles having an average particle diameter of 120 μm (material C).

There were mixed 50% by weight of SiC coarse particles having an average particle diameter of 100 μm, 50% by weight of SiC fine particles having an average particle diameter of 5 μm and 5% by weight, based on 100% by weight of the total SiC particles, of a C powder having an average particle diameter of 2 μm. To 100% by weight of the resulting mixture were added 5% by weight of an organic binder and an appropriate amount of water to obtain a slurry mixture. This slurry mixture was subjected to granulation by the use of a spray dryer to produce granulated particles having an average particle diameter of 120 μm (material D).

Material C was placed in a mold of 100 mm×100 mm. Thereon was placed a SiC fiber cloth. Thereon was placed material C (the SiC fiber cloth was between the two material C layers). The resulting material was subjected to press molding at a pressure of 500 kgf/cm² to obtain a molded material (preliminary molded material C) of 100 mm×100 mm×5 mm.

Using material D, a molded material (preliminary molded material D) of 100 mm×100 mm×5 mm was produced in the same manner as above.

The above two kinds of molded materials were piled in the order of "preliminary molded material C-preliminary molded material D-preliminary molded material C". The resulting material was subjected to press molding to obtain a molded material (molded material 2) of 100 mm×100 mm×15 mm.

Incidentally, as the SiC fiber cloth was used Nicalon (a product of Nippon Carbon Co., Ltd.) or Hinicalon (also a product of Nippon Carbon Co., Ltd.). Molded material 2 using Nicalon was named as molded material 2-1, and molded material 2 using Hinicalon was named as molded material 2-2.

Molded material 2-1 or 2-2 was vertically placed in a carbon crucible filled with a Si powder having a purity of 99.8% and an average particle diameter of 1 mm. The carbon crucible was transferred into a firing furnace.

The temperature inside the firing furnace was kept at 1,100 to 1,400° C. and the crucible contents were subjected to a firing treatment under the conditions of inert gas flow rate, in-furnace pressure and treatment time, shown in Table 1. Then, while the in-furnace pressure was kept at the same level, the in-furnace temperature was increased to the maximum temperature shown in Table 1 to infiltrate Si into molded material 2-1 or 2-2, whereby a SiC fiber-reinforced Si—SiC composite material of Si concentration-gradient type was produced.

The porosity and Si concentration of the composite material are shown in Table 1.

As shown in Table 1, there was a general tendency that at a temperature range of 1,100 to 1,400° C., the porosities of the present materials decreased with the gradual increase of Ar (inert gas) flow rate, in-furnace pressure and firing time. Pores, even when present, were very fine and about 10 μm or less in diameter.

For reducing pores, the interaction of in-furnace pressure with firing time and Ar flow rate was a very important factor.

EXAMPLES 10 to 11 and

Comparative Examples 1 to 2

Oxidation resistance was measured on the SiC fiber-reinforced Si—SiC composite materials of Examples 10 and 11, obtained in Examples 8 and 9; a Si—SiC sintered material [NEWSIC (trade name), a product of NGK Insulators, Ltd.] of Comparative Example 1; and a Si—SiC sintered material (a product of CESIWID Co., Germany) of Comparative Example 2. The results are shown in Table 2.

TABLE 2

| | Oxidation resistance | |
| --- | --- | --- |
| | Weight increase (%) | |
| | After 100 hours | After 500 hours |
| Example 10 | 0.01 | 0.02 |
| Example 11 | 0.008 | 0.015 |
| Comparative Example 1 | 0.01 | 0.02 |
| Comparative Example 2 | 0.01 | 0.34 |

EXAMPLE 12 and

Comparative Examples 3 to 4

Porosity and bending strength were measured on four kinds (sample Nos. 1 to 4) of SiC fiber-reinforced Si—SiC composite materials of Examples 12, obtained in Examples 6 to 9; four kinds of Si—SiC sintered materials [NEWSIC (trade name), products of NGK Insulators, Ltd.] of Comparative Example 3; and four kinds of Si—SiC sintered materials (products of CESIWID Co., Germany) of Comparative Example 4.

TABLE 1

| | Temperature: 1100 ~ 1400° C. | | Flow rate of Ar | Kind of molded | Maximum temperature | Time | Porosity |
| --- | --- | --- | --- | --- | --- | --- | --- |
| | Pressure (hPa) | Time (Hr) | (NL/min) | material | (° C.) | (Hr) | (%) |
| Example 1 | 0.1 | 5 | 0.1 | 1 | 1800 | 1 | 0.15 |
| Example 2 | 10.0 | 8 | 1.0 | 1 | 1700 | 2 | 0.10 |
| Example 3 | 1.0 | 10 | 10.0 | 1 | 1750 | 1 | 0.05 |
| Example 4 | 0.1 | 5 | 0.1 | 2-1 | 1800 | 1 | 0.90 |
| Example 5 | 0.1 | 5 | 0.1 | 2-2 | 1800 | 1 | 0.50 |
| Example 6 | 10.0 | 8 | 1.0 | 2-1 | 1700 | 2 | 0.60 |
| Example 7 | 10.0 | 8 | 1.0 | 2-2 | 1700 | 2 | 0.30 |
| Example 8 | 1.0 | 10 | 10.0 | 2-1 | 1750 | 1 | 0.10 |
| Example 9 | 1.0 | 10 | 10.0 | 2-2 | 1750 | 1 | 0.05 |

The results are shown in Tables 3 and 4.

TABLE 3

Porosity (%)

| | Samples | | | |
| --- | --- | --- | --- | --- |
| | No. 1 | No. 2 | No. 3 | No. 4 |
| Example 12 | 0.1 | 0.1 | 0.2 | 0.2 |
| Comparative Example 3 | 0.1 | 0.1 | 0.2 | 0.2 |
| Comparative Example 4 | 0.8 | 0.9 | 0.9 | 1.0 |

TABLE 4

Bending strength (MPa) at ordinary temperature

| | Samples | | | |
| --- | --- | --- | --- | --- |
| | No. 1 | No. 2 | No. 3 | No. 4 |
| Example 12 | 320 | 325 | 315 | 327 |
| Comparative Example 3 | 265 | 268 | 273 | 275 |
| Comparative Example 4 | 189 | 210 | 218 | 224 |

As shown in Tables 2 to 4, the SiC fiber-reinforced Si—SiC composite materials of Si concentration-gradient type according to the present invention (Examples 10 to 12) can have a porosity of 0.2% or less and, as compared with commercial Si—SiC sintered materials of Comparative Examples 1 (3?) to 4, have about the same oxidation resistance and bending strength and can have higher fracture toughens.

The SiC fiber-reinforced Si—SiC composite material of Si concentration-gradient type of the present invention, obtained by using Nicalon [a SiC fiber cloth (a fiber preform) made of a Si—C—O type silicon carbide fiber] has improved strength at high temperatures and is significantly improved in fragility inherently possessed by ceramics.

The SiC fiber-reinforced Si—SiC composite material of Si concentration-gradient type of the present invention, obtained by using Hinicalon [a SiC fiber cloth (a fiber pre-form) made of a Si—C—O type silicon carbide fiber], as compared with the above composite material obtained using Nicalon, had higher oxidation resistance and creeping resistance.

Incidentally, Nicalon and Hinicalon are produced as follows.

Nicalon, which is a Si—C—O type silicon carbide fiber having a P—SiC structure, is produced by melt-spinning an organic silicic acid polymer (a polycarbosilane) to obtain a continuous fiber, heating the fiber in air to give rise to crosslinking of Si—O—Si and infusibilization, and firing the resulting material in an inert gas atmosphere at 1,200 to 1,500° C.

Hinicalon, which is a Si—C—O type silicon carbide fiber of very low oxygen content (oxygen content=0.5 mass % or less), is produced by melt-spinning a silicon carbide fiber organic silicic acid polymer (a polycarbosilane) to obtain a continuous fiber, irradiating the fiber with an electron beam in a non-oxygen atmosphere to give rise to self-crosslinking and infusibilization of polycarbosilane in the absence of oxygen, and firing the resulting material in an inert gas atmosphere at a temperature of 1,000° C. or higher.

EXAMPLES 13 to 18 and

Comparative Examples 5 to 6

Ten test pieces (3 mm×4 mm×40 mm) as described in JIS R 1601 were cut out from each of the Si—SiC materials of Si concentration-gradient type of Examples 13 to 15 obtained in Examples 1 to 3, the SiC fiber-reinforced Si—SiC composite materials of Si concentration-gradient type of Examples 16 to 18 obtained in Examples 7 to 9, a Si—SiC sintered material [NEWSIC (trade name), a product of NGK Insulators, Ltd.] of Comparative Example 5, and a Si—SiC sintered material (a product of CESIWID Co., Germany) of Comparative Example 6. Microcracks were forcibly formed in each test piece by microindentation. Five of the test pieces with microcracks were measured for bending strength as they were. The remaining five test samples were kept in air at 1,300° C. for 500 hours for surface healing, and then measured for bending strength.

The bending strengths before and after surface healing, of test pieces are shown in Table 5.

TABLE 5

Ordinary-temperature bending strengths (MPa) before and after healing, of test pieces with microcracks forcibly formed by microindentation

| | Ordinary-temperature bending strength (MPa) | | |
| --- | --- | --- | --- |
| | Before healing | After healing | Improvement (%) |
| Example 13 | 118 | 150 | 27 |
| Example 14 | 135 | 178 | 32 |
| Example 15 | 133 | 162 | 22 |
| Example 16 | 153 | 190 | 20 |
| Example 17 | 138 | 186 | 35 |
| Example 18 | 145 | 181 | 25 |
| Comparative Example 5 | 124 | 146 | 18 |
| Comparative Example 6 | 102 | 121 | 19 |

As shown in Table 5, the Si—SiC materials of Si concentration-gradient type of Examples 13 to 15 and SiC fiber-reinforced Si—SiC composite materials of Si concentration-gradient type of Examples 16 to 18, all according to the present invention are superior in healability of microcracks, as compared with conventional Si—SiC sintered materials.

The reason is as follows. In the materials of the present invention, the Si concentration in the surface layer is relatively higher than the Si concentration in the inner-most layer; therefore, the formed microcracks are oxidized by heating and simultaneously healed; as a result, the sizes of defects in material become smaller and the properties of material are retained.

In the SiC fiber-reinforced Si—SiC composite materials of Si concentration-gradient type of Examples 16 to 18, a smaller amount of the microcracks formed by microindentation gives a higher healability in strength, toughness and fragility of ceramic.

[Confirmation and Evaluation of Si Concentration Gradient]

Si concentrations in surface layer and innermost layer were measured for the Si—SiC materials of Si concentration-gradient type obtained in Examples 1 to 3, the SiC fiber-reinforced Si—SiC composite materials of SiC concentration-gradient type obtained in Examples 4, 8 and 9, the commercial Si—SiC sintered material [NEWSIC (trade name), a product of NGK Insulators, Ltd.] of Comparative Example 1, and the commercial Si—SiC sintered material (a product of CESIWID Co, Germany) of Comparative Example 2.

The results are shown in Table 6.

TABLE 6

| | Si concentration (wt. %) | | |
|---|---|---|---|
| | Surface layer (a) | Innermost layer (b) | Ratio (b)/(a) |
| Example 1 | 27 | 13.5 | 50/100 |
| Example 2 | 32 | 11.0 | 34/100 |
| Example 3 | 20 | 14.0 | 70/100 |
| Example 4 | 22.0 | 19.5 | 89/100 |
| Example 8 | 35 | 0.5 | 1/100 |
| Example 9 | 25 | 5.5 | 22/100 |
| Comparative Example 1 | 18.5 | 18.5 | 100/100 |
| Comparative Example 2 | 21.0 | 20.5 | 98/100 |

As is clear from Table 6, in the Si—SiC materials of Si concentration-gradient type and the SiC fiber-reinforced Si—SiC composite materials of SiC concentration-gradient type all according to the present invention, the Si concentration is higher in the surface layer and lower in the innermost layer and has a gradient. Meanwhile, in the commercial products, the Si concentration is almost the same in the surface layer and the innermost layer.

As described above, the Si—SiC material of Si concentration-gradient type and SiC fiber-reinforced Si—SiC composite material of Si concentration-gradient type produced by the present processes are superior in corrosion resistance in highly oxidative and corrosive environment as well as in strength, and is significantly improved in healability of defects of surface layer and innermost layer.

Further, the SiC fiber-reinforced Si—SiC composite material of Si concentration-gradient type according to the present invention is substantially free from pores which are present in conventional ceramic matrix materials (CMC) (e.g. SiC fiber-reinforced Si—SiC composite materials) produced by CVD or inorganic polymer infiltration; therefore, the present composite material, as compared with conventional ceramic matrix composites (CMC), is dense and moreover retains excellent features of Si—SiC sintered material, such as oxidation resistance, creeping resistance, strength from ordinary temperature to high temperatures and toughness.

What is claimed is:

1. A process for producing a Si—SiC material of Si concentration-gradient type by melt-infiltrating Si into a molded material comprising SiC particles, which process comprises preparing at least two kinds of mixtures each comprising SiC particles having a different tap density, laminating the mixtures to form a molded material, keeping the molded material and Si at a temperature of 1,100 to 1,400° C. in an inert gas atmosphere, and then increasing the temperature to 1,500 to 2,500° C. to melt-infiltrate Si into the molded material.

2. A process according to claim 1, wherein the molded material and Si are kept at a temperature of 1,100 to 1,400° C. at a pressure of 0.1 to 10 hPa for at least one hour with an inert gas being flown in an amount of 0.1 NL or more per kg of the total of the molded material and Si, and then the temperature is increased to 1,500 to 2,500° C. to melt-infiltrate Si into the molded material.

3. A process for producing a SiC fiber-reinforced Si—SiC composite material of Si concentration-gradient type obtained by melt-infiltrating Si into a molded material comprising a SiC fiber and SiC particles, which process comprises preparing at least two kinds of mixtures each comprising SiC particles having a different tap density, mixing a SiC fiber into each mixture, laminating the resulting mixtures to form a molded material, keeping the molded material and Si at a temperature of 1,100 to 1,400° C. in an inert gas atmosphere, and then increasing the temperature to 1,500 to 2,500° C. to melt-infiltrate Si into the molded material.

4. A process according to claim 3, wherein the molded material and Si are kept at a temperature of 1,100 to 1,400° C. at a pressure of 0.1 to 10 hPa for at least one hour with an inert gas being flown in an amount of 0.1 NL or more per kg of the total of the molded material and Si, and then the temperature is increased to 1,500 to 2,500° C. to melt-infiltrate Si into the molded material.

* * * * *